US010770254B2

(12) United States Patent
Rout et al.

(10) Patent No.: US 10,770,254 B2
(45) Date of Patent: Sep. 8, 2020

(54) PLUG-ON NEUTRAL CONNECTOR FOR USE WITH A FAULT CIRCUIT INTERRUPT CIRCUIT BREAKER

(71) Applicant: ABB Schweiz AG, Baden (CH)

(72) Inventors: Tapas Ranjan Rout, Hyderabad (IN); Leonardo Dorea Mascarenhas, Agawam, MA (US)

(73) Assignee: ABB Schweiz AG, Baden (CH)

( * ) Notice: Subject to any disclaimer, the term of this patent is extended or adjusted under 35 U.S.C. 154(b) by 6 days.

(21) Appl. No.: 15/729,368

(22) Filed: Oct. 10, 2017

(65) Prior Publication Data
US 2019/0108961 A1 Apr. 11, 2019

(51) Int. Cl.
H01H 71/08 (2006.01)
H01R 4/30 (2006.01)
H01H 71/02 (2006.01)
H02B 1/20 (2006.01)
H02B 1/04 (2006.01)
H01H 1/58 (2006.01)
H01R 4/36 (2006.01)
(Continued)

(52) U.S. Cl.
CPC ............ *H01H 71/08* (2013.01); *H01H 71/02* (2013.01); *H01R 4/30* (2013.01); *H01R 13/652* (2013.01); *H01R 25/16* (2013.01); *H02B 1/205* (2013.01); *H01R 4/36* (2013.01); *H01R 13/05* (2013.01); *H02B 1/041* (2013.01)

(58) Field of Classification Search
CPC . G06F 1/181–182; G06F 1/1601–1611; G06F 1/1613–1698; G06F 1/18–189; H05K 7/20218–20381; H05K 7/20409–20418; H05K 7/20009–202; H05K 5/00–069; H05K 7/00–186; H01L 23/367–3677; H01L 23/473; H01L 23/46–467; H01H 71/08; H01H 71/02; H02B 1/205; H01R 4/30; H01R 4/36; H01R 13/652; H01R 13/05; H01R 25/16
USPC ............. 361/679.01–679.45, 679.55–679.61, 361/724–727, 676–678, 679.46–679.54, 361/688–723, 699–704, 709–710, 361/719–721; 165/80.1–80.5, 104.33, 165/185; 174/15.1–15.3, 16.1–16.3, 547, 174/548; 257/712–722, E23.088; 24/453, 458–459; 454/184; 312/236
See application file for complete search history.

(56) References Cited

U.S. PATENT DOCUMENTS 5,805,414 A * 9/1998 Feldhaeusser ....... H01R 9/2483
174/68.2
5,946,179 A 8/1999 Fleege et al.
(Continued)

OTHER PUBLICATIONS

"Plug-on neutral loadcente", Eaton, "https://www.google.co.in/url?sa=t&rct=j&q=&esrc=s&source=web&cd=3&ved=0ahUKEwjQ9-CAzdHUAhVBt48KHb6mDBMQFgguMAI&url=http%3A%2F%2Fwww.eaton.com%2Fecm%2Fidcplg%3FIdcService%3DGET_FILE%26allowInterrupt%3D1%26RevisionSelectionMethod%3DLatestReleased%26Rendition%3DPrimary%26%26dDocName%3DBR00301006E&usg=AFQjCNHSMYXbUQwIOMQfDAz8aNLAGdMiEQ", Retrieved on Jun. 22, 2017.

(Continued)

*Primary Examiner* — Zachary Pape
(74) *Attorney, Agent, or Firm* — Barnes & Thornburg LLP

(57) ABSTRACT

A plug-on neutral connector includes a neutral terminal plug arranged to be inserted into a neutral terminal of a circuit breaker, a conductive fastener, including a pass-through, electrically coupled to the neutral terminal plug and (Continued)

arranged to be fastened on a neutral bus bar of a load center, and a housing disposed over at least a portion of the conductive fastener.

20 Claims, 6 Drawing Sheets

(51) Int. Cl.
*H01R 13/652* (2006.01)
*H01R 25/16* (2006.01)
*H01R 13/05* (2006.01)

(56) References Cited

U.S. PATENT DOCUMENTS

| | | | |
|---|---|---|---|
| 6,227,913 B1* | 5/2001 | Davis | H02B 1/18 439/620.26 |
| 6,527,598 B1* | 3/2003 | Opel | H01R 9/2408 439/709 |
| 6,560,123 B1* | 5/2003 | de Varennes | H01H 73/08 174/208 |
| 7,508,653 B2 | 3/2009 | Parlee | |
| 7,957,122 B2 | 6/2011 | Sharp | |
| 8,693,169 B2 | 4/2014 | Diaz et al. | |
| 9,203,231 B2* | 12/2015 | Samuelson | H02H 3/16 |
| 9,666,398 B2 | 5/2017 | Robinson et al. | |
| 2003/0228799 A1* | 12/2003 | Machado | H01R 13/6658 439/607.01 |
| 2004/0048142 A1* | 3/2004 | Marusak | B60R 16/0238 429/61 |
| 2007/0268635 A1* | 11/2007 | Bonasia | H01H 83/04 361/42 |
| 2007/0268656 A1* | 11/2007 | Allen | H01H 9/0264 361/643 |
| 2008/0073327 A1* | 3/2008 | Annis | H01H 9/446 218/36 |
| 2008/0246566 A1* | 10/2008 | Oh | H01H 71/08 335/197 |
| 2009/0088029 A1* | 4/2009 | Robinson | H01H 71/08 439/716 |
| 2009/0149048 A1* | 6/2009 | Pavlovic | B60L 3/0069 439/181 |
| 2010/0238611 A1* | 9/2010 | DeBoer | H01H 71/0271 361/634 |
| 2010/0267277 A1* | 10/2010 | Robinson | G01R 11/04 439/517 |
| 2011/0002089 A1* | 1/2011 | Sharp | H02B 1/056 361/673 |
| 2011/0075326 A1* | 3/2011 | Barnas | H02B 1/056 361/624 |
| 2011/0121932 A1* | 5/2011 | Fisher | H01F 38/30 336/192 |
| 2012/0218686 A1* | 8/2012 | Robinson | H02B 1/20 361/637 |
| 2012/0238124 A1* | 9/2012 | Zhao | H01R 13/707 439/350 |
| 2013/0278361 A1* | 10/2013 | Weeks | H05K 5/02 335/6 |
| 2014/0153143 A1* | 6/2014 | Benoit | H01H 1/5866 361/42 |
| 2014/0168862 A1* | 6/2014 | Wheeler | H02B 1/20 361/640 |
| 2014/0321005 A1* | 10/2014 | Samuelson | H02H 3/16 361/42 |
| 2015/0325343 A1* | 11/2015 | Welsh | H01B 7/02 174/115 |
| 2016/0141134 A1 | 5/2016 | Pearson et al. | |
| 2016/0217957 A1 | 7/2016 | Kumar et al. | |
| 2016/0247651 A1* | 8/2016 | O'Brien | H01H 19/04 |
| 2016/0372292 A1* | 12/2016 | Darr | H01H 1/20 |
| 2017/0025830 A1 | 1/2017 | Cordova et al. | |
| 2017/0033523 A1 | 2/2017 | Mittelstadt et al. | |
| 2017/0076896 A1* | 3/2017 | Robinson | H01H 71/0207 |
| 2017/0338072 A1* | 11/2017 | Hiremath | H01H 47/22 |
| 2018/0138626 A1* | 5/2018 | Rout | H02B 1/14 |
| 2018/0138698 A1* | 5/2018 | Tsovilis | H01C 1/022 |

OTHER PUBLICATIONS

"Configuring a plug-on-neutral breaker panel as a subpanel", "https://diy.stackexchange.com/questions/69612/configuring-a-plug-on-neutral-breaker-panel-as-a-subpanel", Retrieved on Jun. 22, 2017.

* cited by examiner

US 10,770,254 B2

PLUG-ON NEUTRAL CONNECTOR FOR USE WITH A FAULT CIRCUIT INTERRUPT CIRCUIT BREAKER

BACKGROUND

The field of the disclosure relates generally to plug-on neutral connectors for use with a fault circuit interrupt circuit breaker, such as a ground fault circuit interrupt (GFCI) circuit breaker and/or an arc fault circuit interrupt (AFCI) circuit breaker, and more particularly to a plug-on neutral connector that includes a conductive fastener having a plurality of flexible conductive legs adapted to cooperatively engage a neutral bus bar of a load center.

AFCI and GFCI circuit breakers are well known and have recently made their way into more mainstream use (e.g., mainstream residential use). Traditionally, AFCI and GFCI circuit breakers have included a separate electrical connection (also referred to as a "pigtail" connection). Specifically, the pigtail connection may function to connect the AFCI or GFCI circuit breaker to a neutral bus bar of an electrical distribution center (or load center) that houses the AFCI or GFCI circuit breaker. Other known AFCI and/or GFCI circuit breakers have included various plug-on neutral connectors, which may be substituted for a pigtail connection and which may directly engage a neutral bus bar within a load center.

Drawbacks associated with common AFCI and/or GFCI circuit breakers may include cluttered load centers (e.g., in the case of circuit breakers utilizing pigtails), overlong or scrimped plug-on neutral connectors, frail plug-on neutral connectors susceptible to damage during circuit breaker installation and replacement, and/or plug-on neutral connectors not configured for interoperation with a variety of circuit breaker makes and models. Thus, a sturdy, adjustable length, plug-on neutral connector capable of robust interoperation with a variety of AFCI and/or GFCI circuit breakers is desirable.

BRIEF DESCRIPTION

In one aspect, a plug-on neutral connector is provided. The plug-on neutral connector includes a neutral terminal plug arranged to be inserted into a neutral terminal of a circuit breaker, a conductive fastener, including a pass-through, electrically coupled to the neutral terminal plug and arranged to be fastened on a neutral bus bar of a load center, and a housing disposed over at least a portion of the conductive fastener.

In another aspect, a circuit breaker is provided. The circuit breaker includes a neutral terminal, and a plug-on neutral connector. The plug-on neutral connector includes a neutral terminal plug arranged to be inserted into a neutral terminal of a circuit breaker, a conductive fastener, including a pass-through, electrically coupled to the neutral terminal plug and arranged to be fastened on a neutral bus bar of a load center, and a housing disposed over at least a portion of the conductive fastener.

In yet another aspect, a circuit breaker is provided. The circuit breaker includes a case, and a plug-on neutral connector. The plug-on neutral connector includes a first neutral terminal plug electrically coupled to a first neutral terminal of the circuit breaker, and a second neutral terminal plug electrically coupled to a second neutral terminal of the circuit breaker. The plug-on neutral connector also includes a conductive fastener, including a pass-through, electrically coupled to the first neutral terminal plug and arranged to be fastened on a neutral bus bar of a load center, and a housing disposed over at least a portion of the plug-on neutral connector and coupled to the case of the circuit breaker.

In yet another aspect, an electrical load center is provided. The electrical load center includes a neutral bus bar electrically connected to a power source, and including a neutral bus bar arranged to receive a neutral bus bar set screw. The electrical load center also includes a mounting rail disposed substantially in parallel with the neutral bus bar, a circuit breaker mounted on the mounting rail, and including a neutral terminal, and a plug-on neutral connector arranged to electrically connect the circuit breaker to the neutral bus bar. The plug-on neutral connector includes a neutral terminal plug arranged to be inserted into the neutral terminal of the circuit breaker, and a conductive fastener electrically coupled to the neutral terminal plug and arranged to be fastened on the neutral bus bar. The conductive fastener includes a first pass-through arranged to receive the neutral bus bar set screw. The plug-on neutral connector also includes a housing disposed over the conductive fastener. The housing includes a second pass-through disposed in alignment with the first pass-through and arranged to receive the neutral bus bar set screw.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to a plug-on neutral connector arranged to be substituted within an electrical load center for a pigtail connection between an AFCI and/or GFCI circuit breaker and a neutral bus bar within the load center. The plug-on neutral connector includes a neutral terminal plug arranged for insertion into a neutral terminal of a circuit breaker and a conductive fastener extending from the neutral terminal plug and arranged to clip onto the neutral bus bar. In addition, in at least some embodiments, a length of the plug-on neutral connector is adjustable for use with a plurality of load center geometries.

Figure 1:
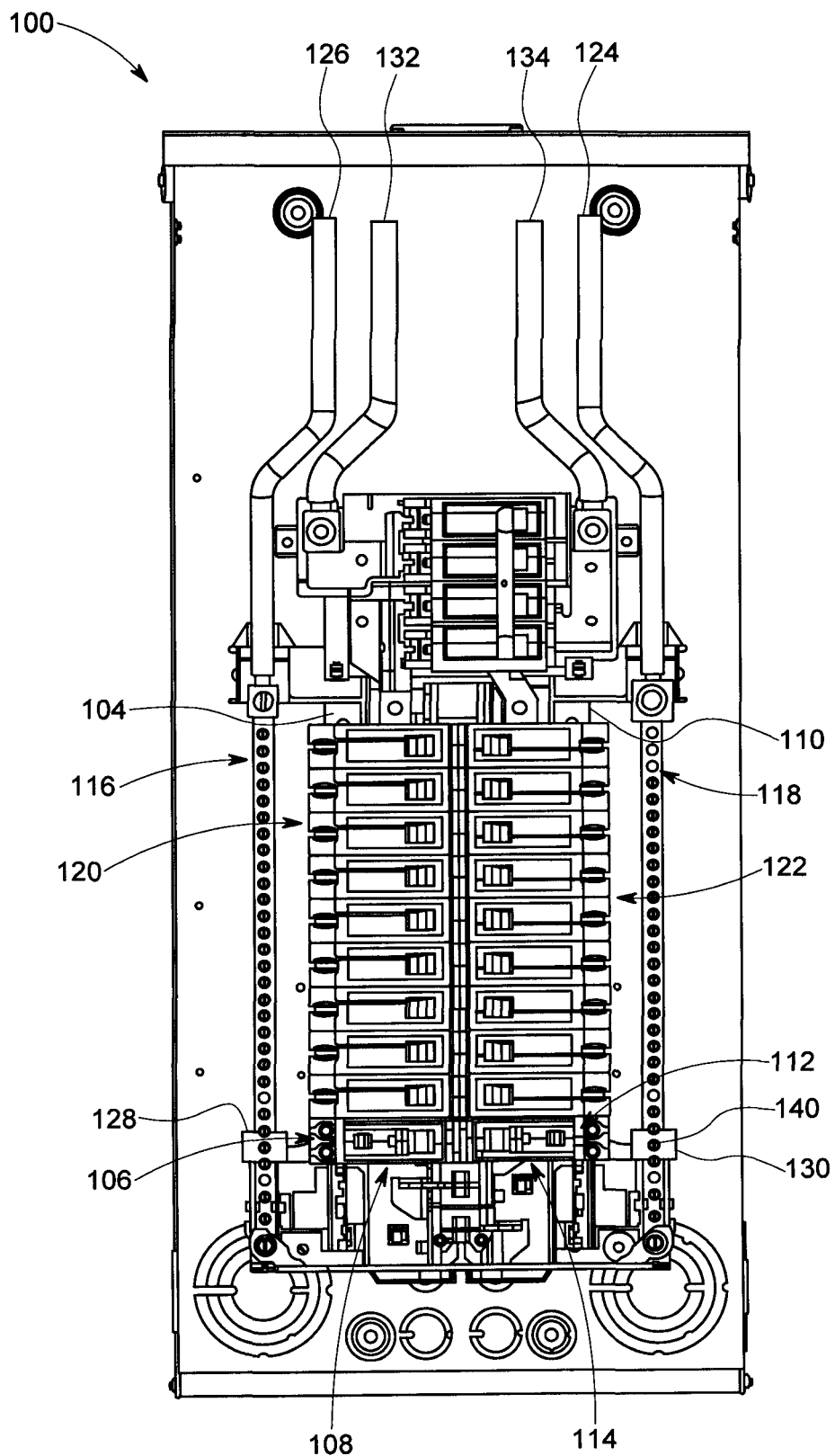
FIG. 1 is a front view of an exemplary electrical load center including a plurality of plug-on neutral connectors.

FIG. 1 is a front view of an exemplary electrical load center 100. In the exemplary embodiment, load center 100 may include a first mounting rail 104 configured to receive a first plurality of circuit breakers, such as circuit breaker 106, which may be organized along a first row 108. Load center 100 may also include a second mounting rail 110 configured to receive a second plurality of circuit breakers, such as circuit breaker 112, which may be organized along a second row 114. To this end, first mounting rail 104 and second mounting rail 110 are elongated structural members and extend substantially parallel to a respective neutral bus bar (as described below). Accordingly, and as shown, circuit breaker 106 may be mounted on and supported by first mounting rail 104, and circuit breaker 112 may be mounted on and supported by second mounting rail 110. First mounting rail 104 and second mounting rail 110 may include any suitable electrically conductive material and may be configured to conduct electrical current.

Load center 100 may also include a first neutral bus bar 116 and a second neutral bus bar 118. As used herein, first neutral bus bar 116 and second neutral bus bar 118 may include any suitable electrically conductive element, such as an elongated electrically conductive element. Moreover, in the exemplary embodiment, first neutral bus bar 116 and/or second neutral bus bar 118 may be electrically connected to a power source, such as a distribution transformer (not shown) configured to supply electrical power to load center 100. Specifically, first neutral bus bar 116 and/or second neutral bus bar 118 may be electrically connected to a distribution transformer (such as through a neutral wire, as described below) to return electrical current flowing back to load center 100 from a load to the distribution transformer.

First neutral bus bar 116 may be spaced apart from first mounting rail 104 and disposed substantially parallel to first mounting rail 104, and a first wiring gutter 120 may be defined between first neutral bus bar 116 and first mounting rail 104. Likewise, second neutral bus bar 118 may be spaced apart from second mounting rail 110 and disposed substantially parallel to second mounting rail 110, and a second wiring gutter 122 may be defined between second neutral bus bar 118 and second mounting rail 110.

In the exemplary embodiment, first neutral bus bar 116 may be electrically coupled to a neutral wire 124 (e.g., to electrically couple first neutral bus bar 116 to a distribution transformer, as described above), and second neutral bus bar 118 may be electrically coupled to a ground wire 126 (which may extend, through a grounding element, to earth ground). However, in other embodiments, first neutral bus bar 116 may be electrically coupled to ground wire 126, and second neutral bus bar 118 may be electrically coupled to neutral wire 124. In other words, the orientation of first neutral bus bar 116 and second neutral bus bar 118 with respect to neutral wire 124 and ground wire 126 is not important, except, as described below, as it relates to the configuration of one or more circuit breakers 106 and/or 112 within load center 100.

Circuit breaker 106 and circuit breaker 112 may include any suitable type of fault circuit interrupter circuit breaker. For example, circuit breaker 106 and circuit breaker 112 may include any combination of arc fault circuit interrupter (AFCI) circuit breakers and/or ground fault circuit interrupter (GFCI) circuit breakers. In addition, each of circuit breaker 106 and circuit breaker 112 may include a case, such as a molded plastic case. Further still, in some embodiments, one or more standard circuit breakers may be installed within load center 100.

Circuit breaker 106 and circuit breaker 112 may be electrically coupled to first neutral bus bar 116 or second neutral bus bar 118, depending upon the placement of a particular circuit breaker 106 or 112 within load center 100. Specifically, a first plug-on neutral connector 128 may be coupled between circuit breaker 106 and first neutral bus bar 116, and a second plug-on neutral connector 130 may be coupled between circuit breaker 112 and second neutral bus bar 118. Application of one or more plug-on neutral connectors, such as first plug-on neutral 128 and/or second plug-on neutral connector 130, may obviate the use of one or more pigtail connections between circuit breaker 106 and/or circuit breaker 112 and a respective neutral bus bar 116 or 118. As described in greater detail below, a "plug-on neutral" connector, such as first plug-on neutral connector 128 and/or second plug-on neutral connector 130 may be configured to "plug on," or connect to, a neutral bus bar, such as first neutral bus bar 116 or second neutral bus bar 118. Thus, the terminology "plug-on neutral connector" may be used to describe a connector that couples to or engages on a neutral bus bar.

Load center 100 may include one or more other structures, such as one or more current carrying (or "hot" wires), such as hot wires 132 and 134, one or more circuit breaker mounting brackets, and the like. However, these structures are not central to an understanding of load center 100 and are not described in additional detail herein.

Figure 2:
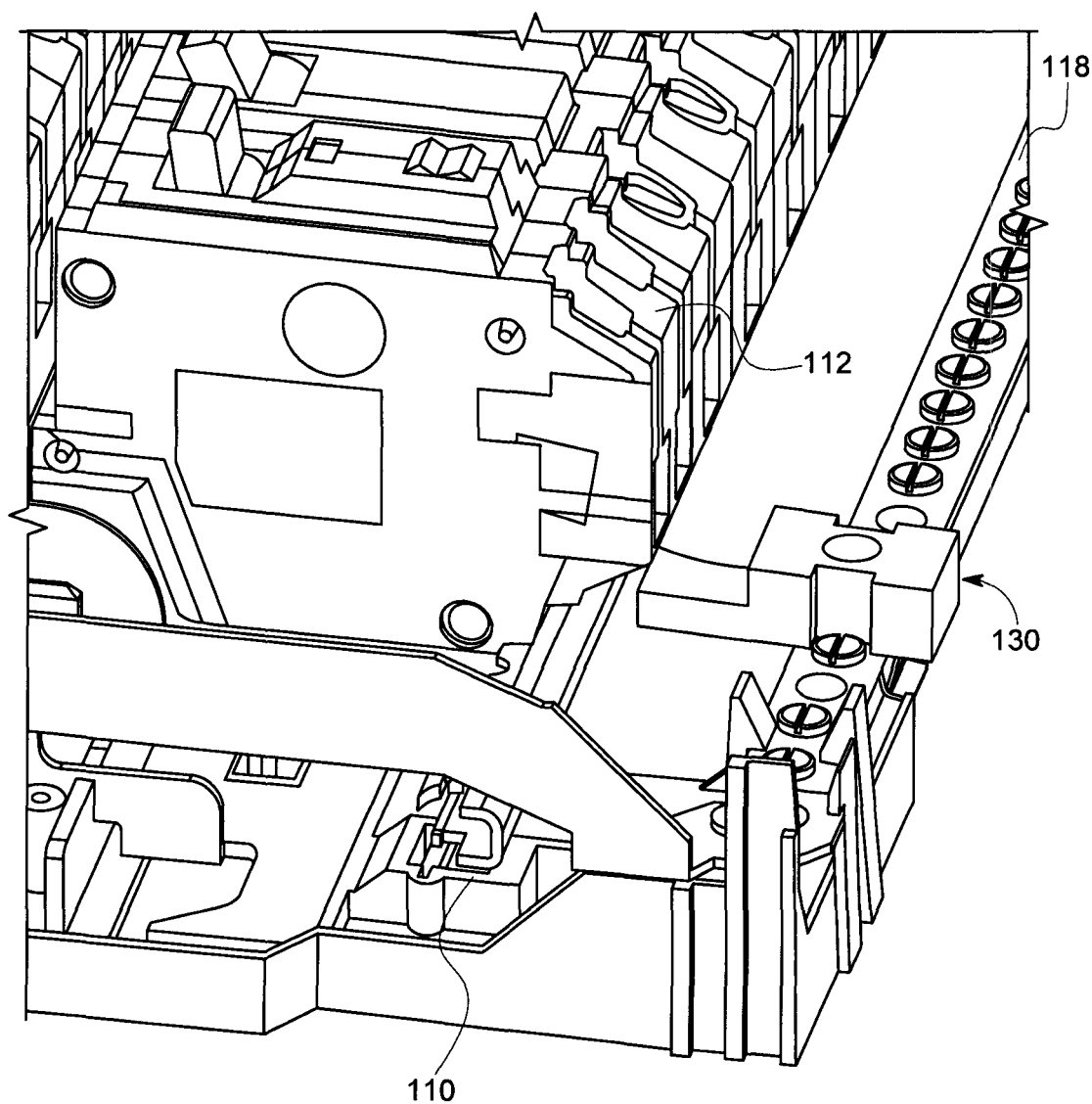
FIG. 2 is a perspective view of an exemplary plug-on neutral connector, as shown at FIG. 1.

FIG. 2 is a perspective view of an exemplary plug-on neutral connector, such as second plug-on neutral connector 130 (as shown at FIG. 1). As shown, second plug-on neutral connector 130 may be electrically and mechanically coupled between a circuit breaker 112 and second neutral bus bar 118. It will be appreciated that, although second plug-on neutral connector 130 is described below, the following description is equally applicable to any other plug-on neutral connector, such as, for example, first plug-on neutral connector 128.

Figure 3:
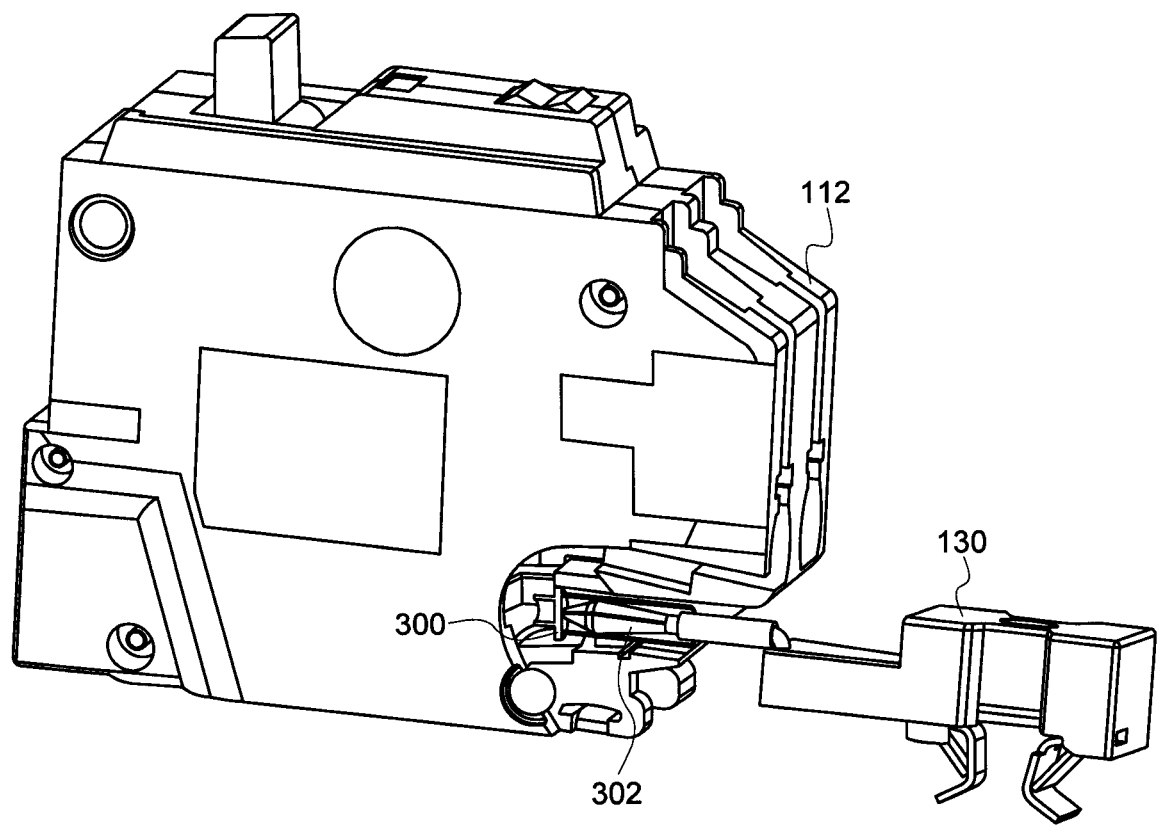
FIG. 3 is a cutaway view of a portion of an exemplary fault interrupt circuit breaker coupled to the plug-on neutral connector shown at FIG. 2.
Figure 4:
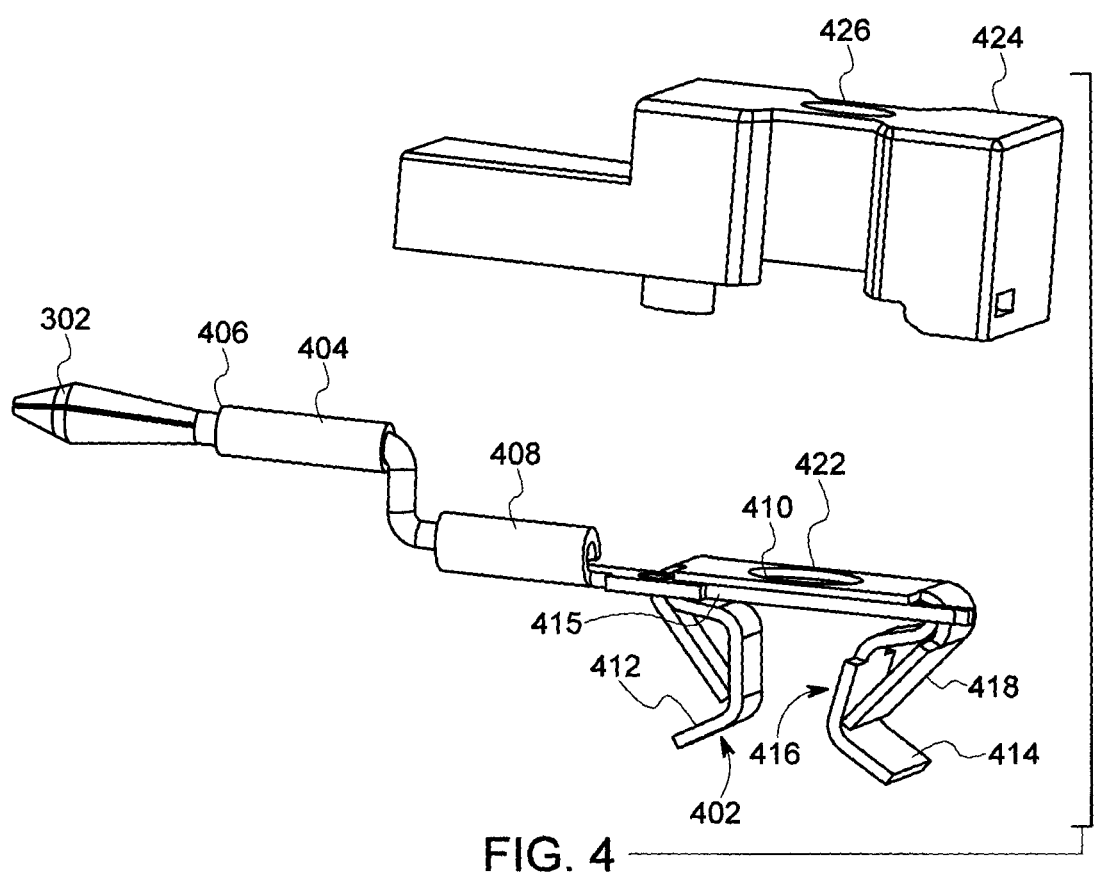
FIG. 4 is an exploded view of the plug-on neutral connector shown at FIG. 2.

FIG. 3 is a cutaway view of a portion of circuit breaker 112 coupled to plug-on neutral connector 130, and FIG. 4 is an exploded view of plug-on neutral connector 130 (shown at FIG. 2). With combined reference to FIG. 3 and FIG. 4, circuit breaker 112 may include a first neutral terminal 300 that is arranged to receive a neutral terminal plug 302 of plug-on neutral connector 130. In the exemplary embodiment, first neutral terminal 300 may include an aperture or a hole that is configured to receive neutral terminal plug 302. Accordingly, neutral terminal plug 302 may include an elongated electrically conductive element, such as a flexible or elastic elongated electrically conductive element configured to slidably couple within first neutral terminal 300. In addition, neutral terminal plug 302 may be secured within first neutral terminal 300 by any suitable means, such as, in one example, by way of a friction fit between neutral terminal plug 302 and first neutral terminal 300.

To this end, and with specific attention to FIG. 4, neutral terminal plug 302 may terminate in any suitable connector type, such as, for example any connector capable of being plugged into or inserted within first neutral terminal 300 (e.g., a "plug-in" connector, such as aa banana plug). However, in other embodiments, neutral terminal plug 302 may include a plurality of concentrically arranged flexible conductive leaves.

In addition to neutral terminal plug 302, plug-on neutral connector 130 may include a conductive fastener 402 arranged to engage on a neutral bus bar within load center 100, such as, for example, second neutral bus bar 118, such that conductive fastener 402 may be electrically and mechanically coupled to second neutral bus bar 118. In the exemplary embodiment, conductive fastener 402 is mechanically and electrically coupled to neutral terminal plug 302, such as by a flexible conductive element 404 (e.g., a wire), which may be coupled between neutral terminal plug 302 and conductive fastener 402.

To couple flexible conductive element 404 between neutral terminal plug 302 and conductive fastener 402, flexible conductive element 404 may be mechanically and electrically coupled to (or inserted within) an end 406 of a conductive receiving port 408 of conductive fastener 402. In various embodiments, conductive receiving port 408 is a flexible or malleable sheet of material and/or a flexible or malleable hollow cylindrical element and may be crimped onto flexible conductive element 404 to secure flexible conductive element 404 within receiving port 408, such that a secure electrical connection is formed between neutral terminal plug 302 and conductive fastener 402.

In addition, in some embodiments, a length of conductive fastener 402 may be adjusted (e.g., increased and/or decreased), such that conductive fastener 402 is capable of being used within load centers of varying dimensions. Specifically, flexible conductive element 404 may be inserted to a desired distance within conductive receiving port 408, such that a total length of conductive fastener 402 is adjustable for use with different load center geometries.

Conductive fastener 402 may, in addition, include a pass-through 410, such as an aperture or a hole. Pass-through 410 may be shaped (e.g., circularly shaped) to receive or accommodate the passage of a neutral bus bar set screw (such as a set screw 140), such that conductive fastener 402 may slide or snap over neutral bus bar set screw 140 without interfering with, or becoming caught on, set screw 140.

In the exemplary embodiment, conductive fastener 402 may also include a plurality of flexible conductive legs, such as a first flexible conductive leg 412 and a second flexible conductive leg 414. First flexible conductive leg 412 and second flexible conductive leg 414 may be substantially L-shaped and may extend from a surface 415 of conductive fastener 402 such that a gap 416 is defined between first flexible conductive leg 412 and second flexible conductive leg 414.

In some embodiments, second plug-on neutral connector 130 may also include a c-shaped clip 418. C-shaped clip 418 may include any suitable elastic material (e.g., metal, plastic, etc.) and may be engaged over and/or mechanically coupled to at least a portion of conductive fastener 402 to apply a pressure on flexible conductive legs 412 and 414, such that flexible conductive legs 412 and 414 are maintained in contact with second neutral bus bar 118 during operation.

C-shaped clip 418 may, in addition, include a pass-through 422, such as an aperture or a hole. Pass-through 422 may be shaped (e.g., circularly shaped) to receive or accommodate the passage of a neutral bus bar set screw (such as set screw 140), such that conductive fastener 402 may slide or snap over neutral bus bar set screw 140 without interfering with, or becoming caught on, set screw 140. To this end, pass-through 422 of c-shaped clip 418 may align with pass-through 410 of conductive fastener 402, such that neutral bus bar set screw 140 is able to be inserted through or received in pass-through 410 and pass-through 422 without interference between second plug-on neutral connector 130 and set screw 140 of second neutral bus bar 118.

In the exemplary embodiment, second plug-on neutral connector 130 may also include a housing 424. Housing 424 may include any suitable electrically insulating material (e.g., plastic) and may be configured to fit over or mechanically couple on conductive fastener 402. Thus, housing 424 may be used during installation to handle and manipulate (e.g., by an installation technician) second plug-on neutral connector 130. Housing 424 may, in addition, include a pass-through 426, such as an aperture or a hole. Pass-through 426 may align with pass through 422 of c-shaped clip 418 and pass-through 410 of conductive fastener, such that neutral bus bar set screw 140 is able to be inserted through or receive in pass-through 426 without interference between housing 424 and set screw 140 of second neutral bus bar 118.

In operation, second plug-on neutral connector 130 may be coupled between circuit breaker 112 and second neutral bus bar 118 to make an electrical connection between circuit breaker 112 and second neutral bus bar 118. More particularly, conductive fastener 402 may, via first flexible conductive leg 412 and second flexible conductive leg 414, be coupled to (or snapped on) second neutral bus bar 118, such that second plug-on neutral connector 130 is mechanically and electrically coupled to second neutral bus bar 118. Likewise, neutral terminal plug 302 may be engaged with or inserted within first neutral terminal 300 of circuit breaker 112 to form a mechanical and electrical connection between circuit breaker 112 and second neutral bus bar 118. In addition, neutral terminal set screw 140 may be inserted through pass-through 426 of housing, pass-through 422 of c-shaped clip 418, and pass through 410 of conductive fastener 402, such that neutral terminal screw 140 can be coupled on or screwed into second neutral bus bar 118 without interference from second plug-on neutral connector 130. Finally, as will be appreciated, a neutral wire (not shown) running from an electrical load powered by load center 100 may be coupled to a second neutral terminal (not shown) of circuit breaker 112.

As described above, although the foregoing description is provided with reference to circuit breaker 112 and second plug-on neutral connector 130, it will be appreciated that the same description may apply to any other AFCI and/or GFCI circuit breaker mounted within load center 100 (e.g., circuit breaker 106) in conjunction with a respective plug-on neutral connector (e.g., first plug-on neutral connector 128).

Figure 5:
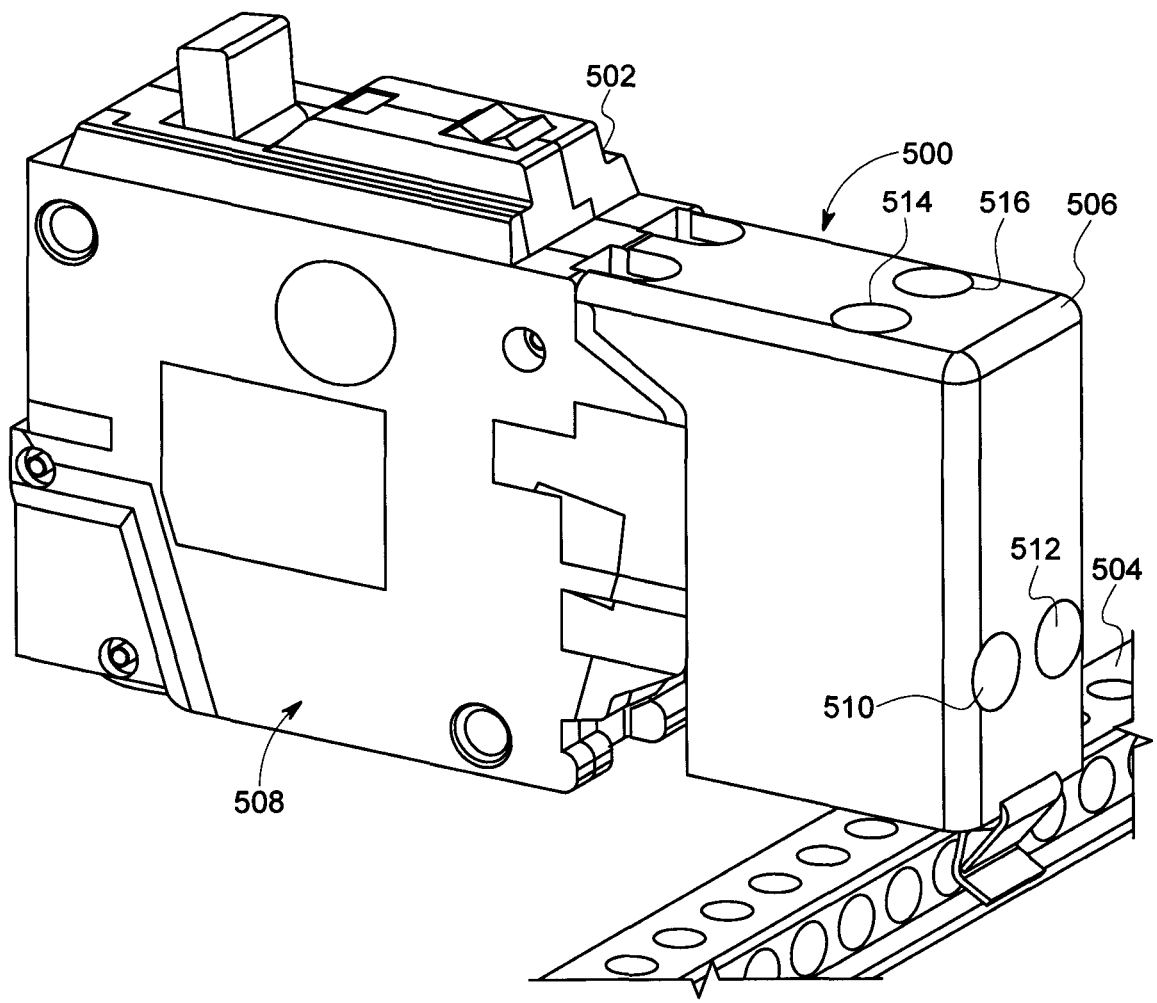
FIG. 5 is a perspective view of another exemplary plug-on neutral connector.

FIG. 5 is a perspective view of another exemplary plug-on neutral connector 500. Plug-on neutral connector 500 is substantially similar to plug-on neutral connectors 128 and 130 (described above), with several exceptions. Accordingly, and as shown, plug-on neutral connector 500 may, like plug-on neutral connectors 128 and 130, be mounted within load center 100 between an AFCI and/or GFCI circuit breaker 502 and a neutral bus bar 504. In addition, like plug-on neutral connectors 128 and 130, plug-on neutral connector 500 may include a housing 506. However, unlike plug-on neutral connectors 128 and 130, housing 506 of plug-on neutral connector 500 may be coupled to a case 508 of circuit breaker 502.

In addition, housing 506 may include a first neutral terminal extension port 510 and a second neutral terminal extension port 512. In the exemplary embodiment, first neutral terminal extension port 510 and second neutral terminal extension port 512 are holes or apertures formed in housing 506. First neutral terminal extension port 510 may electrically couple to (and/or provide access to) a first neutral terminal (not shown) of circuit breaker 502. Similarly, second neutral terminal extension port 512 may electrically couple to (and/or provide access to) a second neutral terminal (now shown) of circuit breaker 502. Those of skill will appreciate that a first neutral terminal of circuit breaker 502 may be configured to couple circuit breaker 502 to neutral bus bar 504, and a second neutral terminal may be configured to couple circuit breaker 502 to a neutral wire running from an electrical load into load center 100. Thus, first neutral terminal extension port 510 and second neutral terminal extension port 512 may give access to a plurality of neutral terminals on circuit breaker 502.

Figure 6:
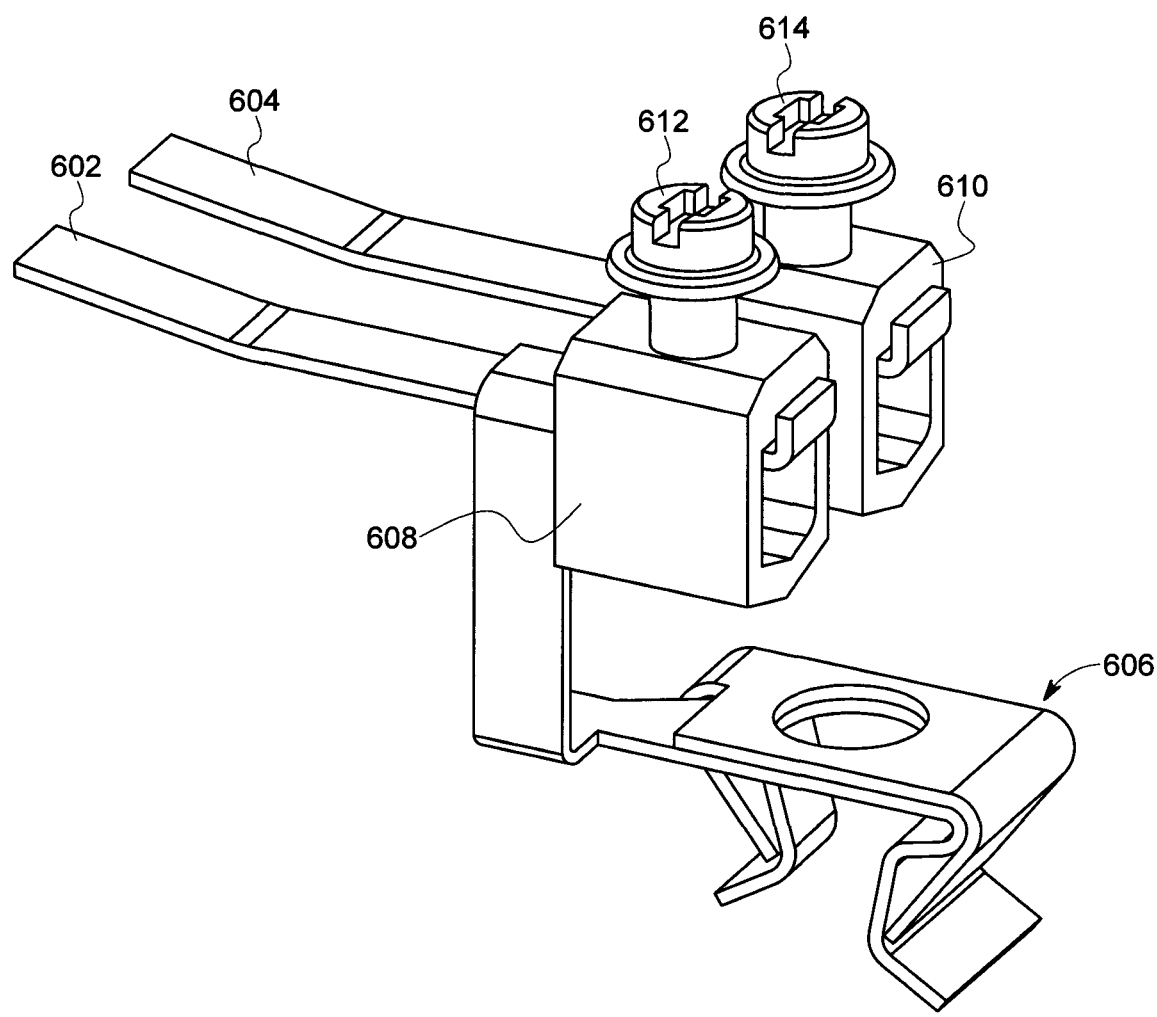
FIG. 6 is a perspective view of a portion of the plug-on neutral connector shown at FIG. 5.

FIG. 6 is a perspective view of an interior portion of plug-on neutral connector 500 (shown at FIG. 5). Like plug-on neutral connectors 128 and 130, plug-on neutral connector 500 may include a first neutral terminal plug 602 (e.g., a conductive strip of metal) arranged to electrically and/or mechanically couple to a first neutral terminal of circuit breaker 502 (e.g., within first neutral terminal extension port 510). However, plug-on neutral connector 500 may also include a second neutral terminal plug 604 (e.g., a conductive strip of metal) arranged to electrically and/or mechanically couple to a second neutral terminal of circuit breaker 502 (e.g., within second neutral terminal extension port 512).

In the exemplary embodiment, first neutral terminal plug 602 may be coupled to a conductive fastener 606, which may be substantially similar and/or identical to conductive fastener 402. However, first neutral terminal plug 602 and second neutral terminal plug 604 may also include a first terminal block 608 and a second terminal block 610, respectively. Both of first terminal block 608 and second terminal block may include an electrically conductive body of material tapped to receive a set screw. For example, first terminal block 608 may receive a first set screw 612, and second terminal block 610 may receive a second set screw 614. In addition, first terminal block 608 may be disposed within (and accessible from) first neutral terminal extension port 510, and second terminal block 610 may be disposed within (and accessible from) second neutral terminal extension port 512. In addition, and in the exemplary embodiment, housing 506 may include a first aperture 514 arranged to receive first set screw 612 and a second aperture 516 arranged to receive second set screw 614. Thus, first aperture 514 and second aperture 516 may provide access, through housing 506, to first set screw 612 and second set crew 614, respectively.

In operation, plug-on neutral connector 500 may engage on neutral bus bar 504 substantially as described above with respect to second plug-on neutral connector 130. Thus, a first neutral terminal of circuit breaker 502 may be electrically coupled to neutral through neutral bus bar 504. Similarly, a neutral wire (not shown) running from an electrical load (not shown) powered by load center 100 may be tied to second terminal block 610, such that the electrical load is coupled through second terminal block 610 to a second neutral terminal of circuit breaker 502.

Embodiments of the plug-on neutral connector, as described above, thus facilitate substitution of a plug-on neutral connector for a pigtail connection between an AFCI and/or GFCI circuit breaker and a neutral bus bar within an electrical load center. The plug-on neutral connector includes a neutral terminal plug arranged for insertion into a neutral terminal of a circuit breaker and a conductive fastener extending from the neutral terminal plug and arranged to clip onto the neutral bus bar. In addition, in at least some embodiments, a length of the plug-on neutral connector is adjustable for use with a plurality of load center geometries.

Exemplary technical effects of the plug-on neutral connector described herein include, for example: (a) removal of a plurality of cumbersome pigtail connections from one or more wiring gutters of a load center; (b) implementation of one or more plug-on connectors in the load center, such that wiring clutter in the load center is reduced; (c) implementation of one or more plug-on connectors in the load center, such that the load center is maintained neatly and compactly; and (d) implementation of one or more sturdy, adjustable length, plug-on neutral connectors capable of robust interoperation with a variety of AFCI and/or GFCI circuit breakers.

Exemplary embodiments of a plug-on neutral connector and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiments can be implemented and utilized in connection with many applications where a plug-on neutral connector is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A plug-on neutral connector comprising:
a neutral terminal plug arranged to be inserted into a neutral terminal of a circuit breaker;
a conductive fastener electrically coupled to said neutral terminal plug and arranged to be fastened on a neutral bus bar of a load center, said conductive fastener comprising a first pass-through; and a housing disposed over at least a portion of said conductive fastener, said housing comprising a second pass-through disposed in alignment with said first pass-through.

2. The plug-on neutral connector of claim 1, wherein said neutral terminal plug is a plug-in connector.

3. The plug-on neutral connector of claim 1, wherein said first and second pass-throughs are arranged to receive a neutral bus bar set screw.

4. The plug-on neutral connector of claim 1, wherein said conductive fastener further comprises a plurality of flexible conductive legs arranged to cooperatively engage on the neutral bus bar of the load center.

5. The plug-on neutral connector of claim 1, further comprising a flexible conductive element coupled between said neutral terminal plug and a receiving port of said conductive fastener.

6. The plug-on neutral connector of claim 1, further comprising a c-shaped clip engaged over at least a portion of said conductive fastener between said conductive fastener and said housing.

7. The plug-on neutral connector of claim 6, wherein said c-shaped clip comprises a third pass-through.

8. The plug-on neutral connector of claim 7, wherein said third pass-through is aligned with said first and second pass-throughs, and wherein said first, second, and third pass-throughs are arranged to receive a neutral bus bar set screw.

9. A circuit breaker comprising:
a neutral terminal; and
a plug-on neutral connector comprising:
a neutral terminal plug inserted into said neutral terminal of said circuit breaker;
a conductive fastener electrically coupled to said neutral terminal plug and arranged to be fastened on a neutral bus bar of a load center, said conductive fastener comprising a first pass-through;
a housing disposed over at least a portion of said conductive fastener; and
a c-shaped clip engaged over at least a portion of said conductive fastener between said conductive fastener and said housing.

10. The circuit breaker of claim 9, wherein said circuit breaker is one of an arc fault circuit interrupter (AFCI) circuit breaker and a ground fault circuit interrupter (GFCI) circuit breaker.

11. The circuit breaker of claim 9, wherein said first pass-through is arranged to receive a neutral bus bar set screw.

12. The circuit breaker of claim 9, wherein said conductive fastener further comprises a plurality of flexible conductive legs arranged to cooperatively engage on the neutral bus bar of the load center.

13. The circuit breaker of claim 9, wherein said plug-on neutral connector further comprises a flexible conductive element coupled between said neutral terminal plug and a receiving port of said conductive fastener.

14. A circuit breaker comprising:
a case; and
a plug-on neutral connector comprising:
a first neutral terminal plug electrically coupled to a first neutral terminal of said circuit breaker;
a second neutral terminal plug electrically coupled to a second neutral terminal of said circuit breaker;
a conductive fastener electrically coupled to said first neutral terminal plug and arranged to be fastened on a neutral bus bar of a load center, said conductive fastener comprising a first pass-through;
a housing disposed over at least a portion of said conductive fastener and coupled to said case of said circuit breaker; and
a c-shaped clip engaged over at least a portion of said conductive fastener between said conductive fastener and said housing.

15. The circuit breaker of claim 14, wherein said first pass-through is arranged to receive a neutral bus bar set screw.

16. The circuit breaker of claim 14, wherein said conductive fastener further comprises a plurality of flexible conductive legs arranged to cooperatively engage on the neutral bus bar of the load center.

17. The circuit breaker of claim 14, wherein said c-shaped clip comprises a second pass-through.

18. The circuit breaker of claim 17, wherein said second pass-through is aligned with said first pass-through and is arranged to receive a neutral bus bar set screw.

19. The circuit breaker of claim 14, wherein said housing comprises at least one neutral terminal extension port arranged to couple a neutral wire running from a load to said second neutral terminal.

20. An electrical load center comprising:
a neutral bus bar electrically connected to a power source, said neutral bus bar arranged to receive a neutral bus bar set screw;
a mounting rail disposed substantially in parallel with said neutral bus bar;
a circuit breaker mountable on said mounting rail, said circuit breaker comprising a neutral terminal; and
a plug-on neutral connector arranged to electrically connect said circuit breaker to said neutral bus bar, said plug-on neutral connector comprising:
a neutral terminal plug arranged to be inserted into said neutral terminal of said circuit breaker;
a conductive fastener electrically coupled to said neutral terminal plug and arranged to be fastened on said neutral bus bar, said conductive fastener comprising a first pass-through arranged to receive the neutral bus bar set screw; and
a housing disposed over said conductive fastener, said housing comprising a second pass-through disposed in alignment with said first pass-through and arranged to receive the neutral bus bar set screw.

* * * * *